UNITED STATES PATENT OFFICE.

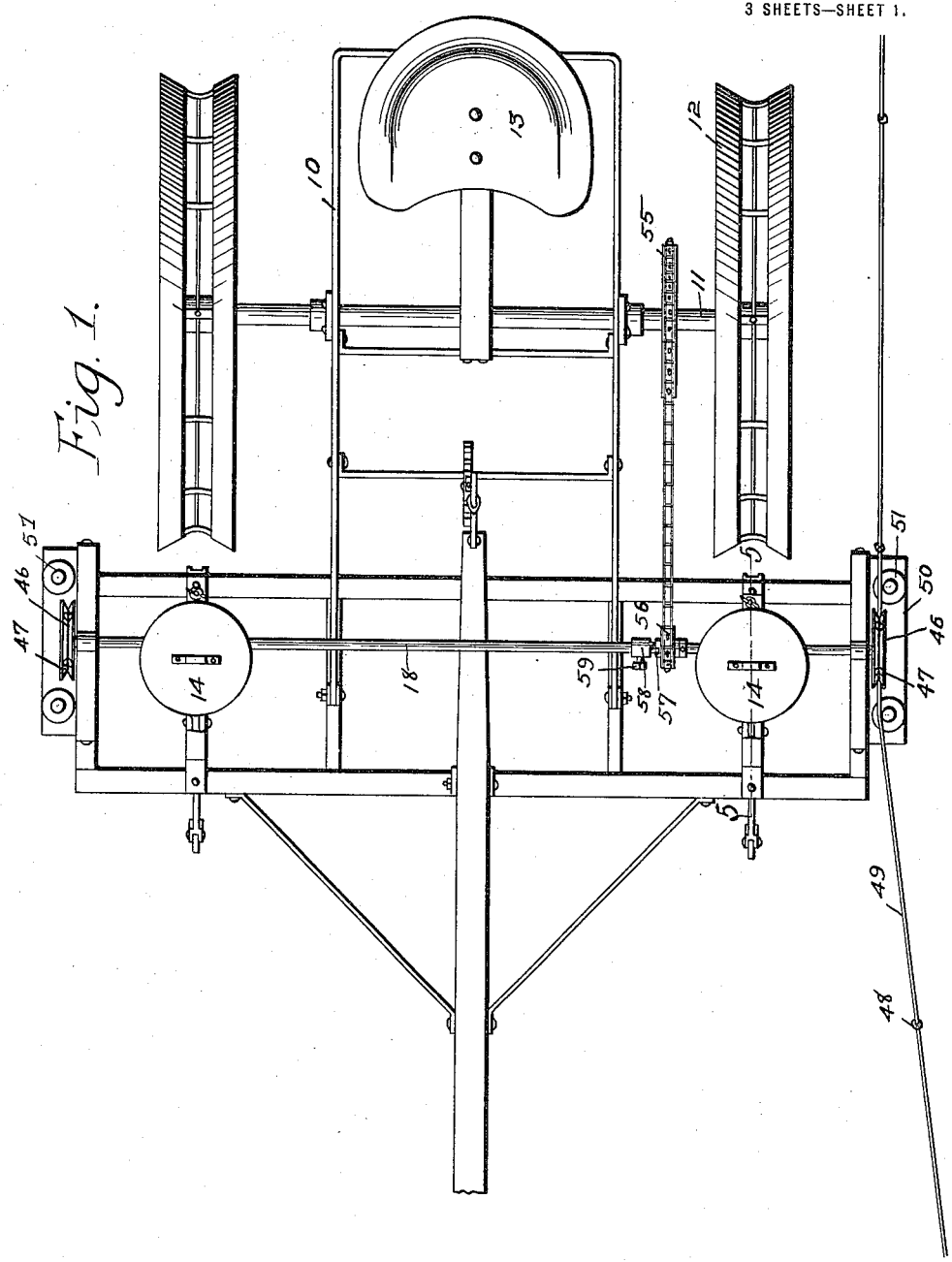

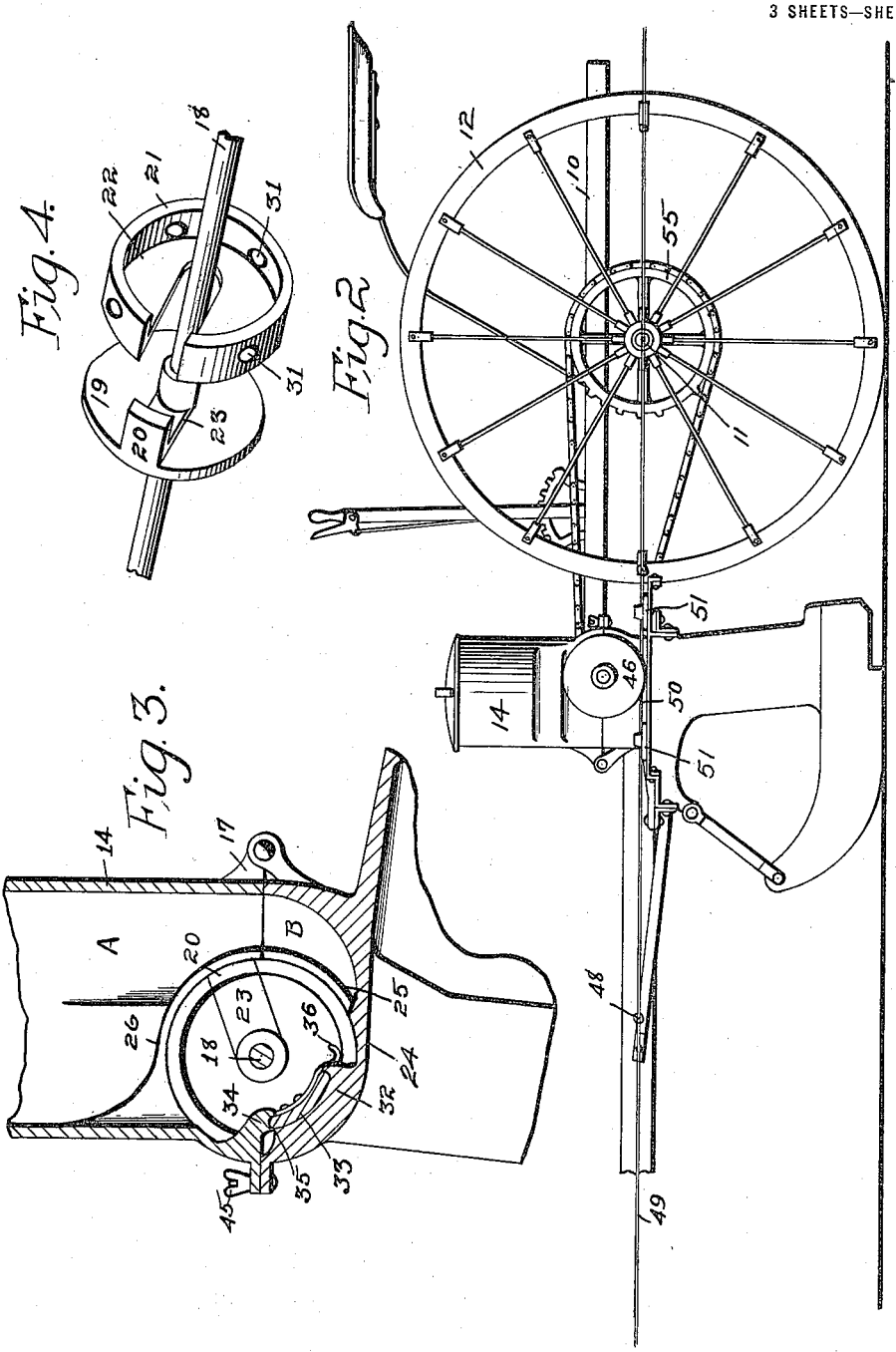

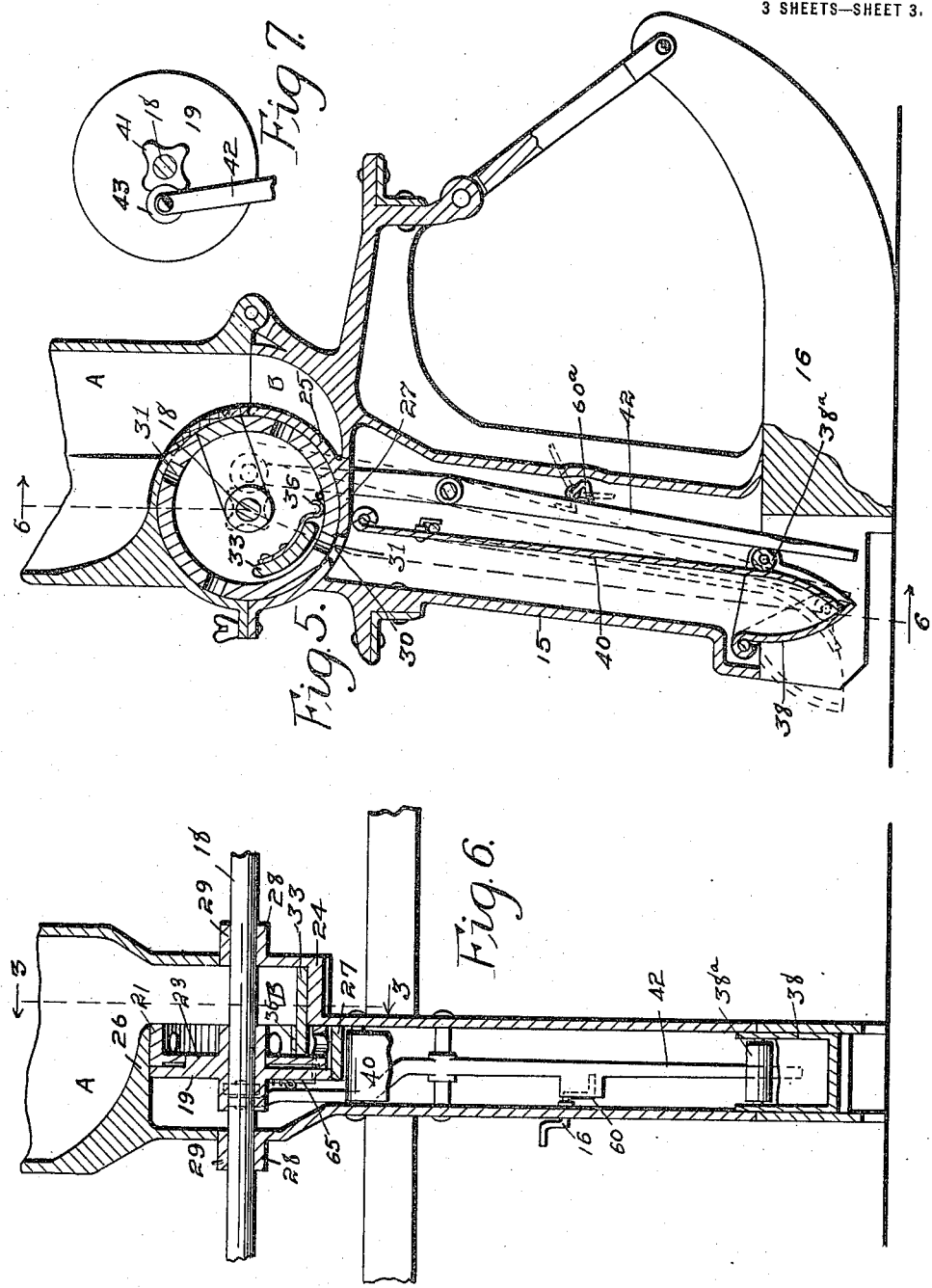

MADS H. MADSEN, OF KIMBALLTON, IOWA.

CORN-PLANTER.

1,155,592.   Specification of Letters Patent.   Patented Oct. 5, 1915.

Application filed July 14, 1913. Serial No. 779,065.

*To all whom it may concern:*

Be it known that I, MADS H. MADSEN, a citizen of the United States, and resident of Kimballton, in the county of Audubon and State of Iowa, have invented a new and useful Corn-Planter, of which the following is a specification.

The object of my invention is to provide a corn planter of comparatively simple and inexpensive construction, including a novel seed dropper, whereby the dropper plate is operated from the wire with a minimum of friction thereon.

More particularly it is my purpose to provide in a corn planter a seed dropper of novel construction, which is comparatively inexpensive to manufacture and is quickly and easily assembled or taken apart.

Still a further object is to provide such a device in which the seed dropping mechanism is operated from the wire, assisted by a force drop attachment instead of from the draft wheels of the machine.

My invention consists in certain details, in the construction, combination and arrangement of the various parts of the device, whereby the objects contemplated are attained, as hereinafter more fully set forth, pointed out in my claims and illustrated in the accompanying drawings, in which:

Figure 1 shows a top or plan view of a corn planter embodying my invention. Fig. 2 shows a side elevation of same. Fig. 3 shows a vertical sectional, detail view through one of the planter boxes and dropper plates, taken on the line 3—3 of Fig. 6. Fig. 4 shows a perspective view of one of the dropper plates. Fig. 5 shows a vertical detail sectional view through the planter boxes and the portion of the planter shown, illustrating the dropper plate and the dropping mechanism taken on the line 5—5 of Fig. 1. Fig. 6 is a vertical transverse sectional view, taken on the line 6—6 of Fig. 5. Fig. 7 is a detail view of the dropping mechanism on the shaft which carries the dropper plate.

In the accompanying drawings I have used the reference numeral 10 to indicate generally the frame of my improved corn planter. Mounted on the frame 10 is an axle 11 on which are ordinary supporting wheels 12. On the frame 10 is also a seat 13. On the forward portion of the frame I mount the seed boxes 14. Extending downwardly from below the seed boxes 14 are seed conducting tubes 15, connected with the lower ends of which are shoes or furrow openers 16. The seed boxes 14 are divided and the parts are hinged together at one side at 17, so that the top of each box may be swung upwardly and forwardly, leaving the bottom of the box open. It will therefore be seen that each seed box is composed of the upper portion A and a lower portion B.

Extending transversely across the upper portion of the frame, near the forward end thereof and through the boxes 14 is a shaft 18, fixed on which is a disk 19, formed at the edge of which is a laterally extending lug 20, clearly shown in Fig. 4. I provide a plurality of detachable dropper plates, each comprising a ring or band 21 and a disk or flat portion 22 preferably integral therewith. The band 21 and disk 22 have portions cut away to permit the dropper plate to be extended over the shaft 18. Formed on the disk 19 is a plate 23. When the dropper plate is dropped over the shaft 18, the plate 23 and the lug 20 fill the spaces left by cutting away portions of the disk 22 and ring 21 so that the dropper plate is firmly locked together with the disk 19 and rotates with the shaft 18. The bottom of the seed box extends across the top of the conducting tube 15 and comprises the bottom member 24. Extending upwardly from the member 24 is a curved flange 25, designed to engage and form a bearing for the dropper plate flange 21. Formed on the wall of the portion A of the box 14 is a flange 26 designed to engage and form a bearing for the upper portion of the dropper flange 21. A portion of the bottom 24, adjacent to the lower end of the flange 25, is dropped below the level of the main portion of the bottom 24, forming a curved bearing 27 for the dropper flange 21. Formed on the parts A and B are opposite flanges 28 and 29, which form bearings for the shaft 18. In the bottom member 27 is an opening 30, through which the grain passes into the conducting tube 15. In the flange 21 are a plurality of seed openings 31. Formed in the portion B of the box 14 is a seat 32 to receive a cover plate 33 which extends over the flange 21 and above the opening 30, as shown in Figs. 5 and 6.

Formed in the interior of the portion A of the box 14 is an inwardly extending boss or lug 34, in which is a groove 35, designed to receive and engage the plate 33 when the portion A is locked down adjacent to the portion B. The plate 33 is slightly spaced above the flange 21. Extending beyond the portion of the plate 33 which is above the flange 21 is a spring device 36 to clear away the surplus corn on the dropper plate.

I have provided a force drop mechanism which I will now describe. At the lower end of the tube 15 is a member 38 comprising a rear wall and side walls. The member 38 is pivoted at its upper rear edge to the walls of the tube 15. The member 38 is open at its top and at its forward side. Mounted between the side walls of the member 38, at its forward upper edge, is a roller 38ª. Secured to the walls of the tube 15 is a flat spring 40 which extends downwardly and normally presses against the roller 38ª and is so shaped as to normally close the forward side of the member 38, as shown in Fig. 5. The roller 38ª is arranged below the level of the pivotal point of the member 38. Fixed on the shaft 18 is a four point cam 41 shown in Fig. 7. Pivoted to the walls of the tube 15 is a lever 42 which extends upwardly from its pivotal point and is provided at its upper end with a roller 43 which is in engagement with the cam 41. The lever 42 also extends downwardly from its pivotal point and at its lower end engages the forward side of the roller 38ª.

It will be seen that the forward pressure at the lower end of the spring 40 causes the roller 38ª to engage the lever 42, thereby holding the upper end of said lever and the roller 43 in engagement with the cam 41 at one of the places thereon between two of the points thereof. The shaft 18 is thereby held against movement and this prevents any movement of the dropper plate. On the outer ends of the shaft 18 are grooved wheels 46, shown in Fig. 1, each of which is provided with four notches 47, designed to engage the knots 48 on the wire 49. On the frame of the machine, at each side thereof and adjacent to and below each disk 46 is a bracket 50, on which are guide rollers 51.

In Figs. 8, 9 and 10 of the drawings I have shown another form of my improved planter which is really my preferred form thereof. In the preferred form I use the same shoes or furrow openers 16 secured to the frame or support 60 on which is mounted seed box which is divided into the lower portion 61 and the upper portion 62 hinged thereto by the hinges 63. The shaft 18 extends as hereinbefore described transversely through the box. Extending downwardly below the box is a tube or planter leg 64, preferably rectangular in cross section and having its forward wall inclined rearwardly to about the middle of the tube 64 at its lower end at 65. The rear portion of the lower end of the tube 64 is open at its lower end, as shown in Fig. 8. The disk plate of my improved form of planter comprises a disk 66 having at its outer edge a laterally extending circumferential annular flange 67 of considerable thickness. The flange or ring 67 is provided with a plurality of screw threaded openings 68 extending through it and partially filled by the screw threaded bolts or plugs 69, the outer surfaces of which are provided with central recesses 70 at the bottom of which recesses are notches 71 to receive a screw driver. Formed in the portion 62 of the seed box is a flange 72 which engages one side of the disk 66 and prevents the dropping of grain between the disk 66 and the lower portion 61 of the seed box. Formed on the lower portion 61 of the seed box is a flange 73 which serves as a bearing for the disk 66 and flange 67. On the shaft 18 is a cam 41, having alternate notches and projections, as shown in Fig. 7. Pivoted to the side walls of the tube 64 is a broad flat spring 74 which extends above and below the pivotal points 75, as shown in Fig. 8. In the upper end of the spring 74 is mounted a roller 43, designed to engage the cam 41. The lower end of the spring 74 is curved forwardly to meet the portion 65, as clearly shown in said Fig. 8. When the roller 43 engages one of the projections on the cam 41, the upper portion of the spring 74 is moved forward and the lower portion rearward, leaving a space between the lower portion of the spring 74 and the member 65, through which the grain drops to the ground. Secured to the upper end of the spring 74 is a coil spring 76, which is adjustably mounted on the lower portion 61 of the seed box by means of the screw threaded bolt 77 and a thumb nut 78. The spring 76 holds the roller 43 tightly against the cam 41. The disk 66 and flange 67 are so located in the seed box that a space is left between said flange and the wall of the seed box on one side, as indicated by the reference numeral 78. Secured to the seed box is a spring 79, the upper end of which is curved, as shown at 80. A narrow flange 81 extends inwardly from one wall of the portion 62 to the curved portion 80 of the spring 79. Said curved portion 80 prevents any grain from passing downwardly into the space 78, excepting such as is received in the opening of the plug 69.

I will now describe the assembling and practical operation of my improved corn planter. In assembling the form first described, the member A is unfastened from the member B of the seed box and is tipped upwardly. The plate 21 and disk 22 are slipped down over the shaft 18 until the members 23 and 20 are received in the openings in the disk 22 and in the plate 21. The plate 33 is then slipped into position in the seat 32 and the member A is dropped to its proper position and secured to the member B by means of thumb screws 45. Corn is then placed in the seed boxes 14. The wire 49 is then stretched and is placed above the bracket 50 beneath the grooved wheel 46 and in engagement with the rollers 51. The lower portion of each disk 46 is slightly below the level of the rollers 51 so that the said rollers hold the wire against the lower member of the wheel 46. When the machine is driven forward one of the knots 48 engages a notch 47 in the disk 46, thereby rotating the shaft 18 a quarter revolution. The corn in the boxes 14 drops upon the flange 21 and into the openings 31. As the shaft 18 rotates the surplus corn is cleared away by the spring device 36. The rotation of the shaft brings the filled openings 31 beneath the plate 33 where it registers with the opening 30 in the bottom of the portion B of the seed boxes 14. The corn then drops downwardly in the tube 15 and is held in the bottom thereof between the member 38 and the spring 40. When the knot 48 on the wire 49 engages one of the notches of the wheel 46 the shaft 18, as has been stated, is turned a quarter revolution causing one of the points or projections of the cam 41 to engage the roller 43 and move the lever 42. The first movement of the shaft 18 rotates the dropper plate and causes grain or seed to be deposited, as hereinbefore stated, in the tube 15. The next movement of the shaft 18 operates the lever 42 again. The lower end of said lever presses rearwardly on the roller 38ª. On account of the manner in which the member 38 is pivoted said member is thrown rearwardly, as is also the lower end of the spring 40, for throwing the seed rearwardly and downwardly. By the time this operation is completed, the plate 21 makes another quarter revolution and when the receptacle 38 and the spring 40 return to normal position a second deposit of seed is made from the seed boxes. This operation may be continued indefinitely.

In the operation of both forms of my device, particular attention is called to the form of the cam 41 with its alternate projections and depressions.

In the ordinary wire drop corn planter, one of the serious difficulties experienced is due to the construction of the two spring controlled fingers which stand adjacent to each other and receive between them the wire. When the knot on the wire strikes the fingers, it swings them over, thereby operating the dropping mechanism and then passes free from the fingers. With the mechanism ordinarily used, the knot is constantly catching and jerking the fingers so that the wire and other mechanism are frequently broken. Therefore, particular attention is called to the form of the cam 41 and the parts operatively connected therewith, whereby the difficulty just mentioned above is avoided where my device is used.

The cam 41 and the parts operatively connected therewith, including the wheel 46, are so shaped that when the knot on the wire engages the notch 47 on said wheel, thereby rotating the wheel and the shaft 18 for the first part of a quarter revolution, the center of one of the points on the cam 41 passes the roller 43. As soon as the center of the point has passed the roller 43, then the tendency of the spring 76 is to press against the point to assist in imparting rotation to the shaft 18. The parts are so arranged that the center of the point on the cam 41 passes the roller 43 when the knot on the wire is at the lower part of the wheel 46. It therefore follows that the spring which affects the member 42 assists in moving the shaft 18 and the wheel 46 during the last part of each quarter revolution so that it is easier for the knot on the wire to be disengaged from the wheel 46 than would otherwise be the case.

For using my improved seed corn planter as a drill, I have provided the following additional mechanism. On the shaft 11 is a sprocket 55 and on the shaft 18 is a sprocket 56. The sprocket 56 is rotatably but nonslidably mounted and the sprocket 55 is fixed. Formed on the sprocket 56 is a clutch member 57, designed to coact with the clutch member 58 on the shaft 18. The clutch member 58 may be fixed in any position of its movement on the shaft 18, by means of the set screws 59, and when thrown into engagement with the clutch member 57 the wire 49 may be dispensed with and the shaft 18 operated from the wheels 12, in which case the planter is used as a drill. For locking the spring 40 in its forward position and thereby holding the device 38 open for drilling, I have mounted on the wall of the conducting tube 15 a spring catch device 60ª which in one position of its movement engages the lower portion of the lever 42, thereby pressing the receptacle 38 and the spring 40 rearwardly and holding them in their rearward position.

The advantages of my improved corn planter are numerous. Attention is called to the extreme simplicity of the construction and operation of the dropper plate. On account of its arrangement on the shaft 18 I am able to dispense entirely with most of the gearing devices used where the horizontal type of dropper plate is employed. The flange 26 not only serves as a bearing for the dropper plate but also relieves it from some of the friction or pressure from the corn in the box 14. It will readily be seen that by tipping the portion A of the box 14 upwardly on its hinges the plates 33 and 21 may be quickly and easily removed. A flange 21 of different size and with different sized holes may be easily inserted in position. It is held in position by the shaft 18, the flanges 26 and 25 and by the bottom 24 and a portion 27 of said bottom. On account of the fact that the dropper plate is actuated directly from the shaft 18, less power is required to operate it and I am thereby enabled to operate the shaft directly from the wire 49.

Attention is called to the fact that the use of the cam 41 and the lever 42 and the notched disk 46 results in a quarter revolution of the shaft with the passage of each button 48. The shape of the cam 41 locks the shaft in proper position to hold the disk 46 in such position that the proper notch is engaged by the next button 48. The form of the cam 41 and the arrangement of the lever 42 also holds the plate 21 against floating movement.

The parts of my improved planter are of simple and inexpensive construction.

As a further security against floating movement of the plate 21, I have mounted on the disk 19 a spring catch device 65 which extends through the disk 19 and enters a slot in the portion 22, as shown by the dotted lines in Fig. 6. My planter may be used with an ordinary planter wire as a drill.

I claim another advantage for my planter in the method of holding the wire 49 by means of the rollers 51 in such manner that it engages the lower side of the disk 46. By this construction I am able to operate the disk 46 with a minimum of friction and can operate it direct from the wire instead of operating it from the wheels 12. On account of the construction just mentioned, I am able to dispense with the large number of parts and gears which are used on ordinary planters.

It will be understood that some changes may be made in the construction of my machine and it is my intention to cover by this application any changes in the details of construction which may come within the scope of the appended claims.

I claim as my invention:

1. In a corn planter, the combination of a frame having a planter box, a dropper, a shaft, means for operating said dropper from the shaft, a grooved wheel on said shaft provided with notches adapted to be engaged by an ordinary wire having knots or the like, guide devices for holding said wire adjacent to the lower portion of said wheel, a cam wheel on said shaft, an arm, a roller thereon adapted to engage said cam wheel, yielding means for holding said roller against said cam, said cam and said grooved wheel being so constructed that when one of the knots on the wire engages one of the notches in the grooved wheel, the shaft is rotated for moving a projecting portion of the cam past said roller, whereupon said yielding means acts upon said arm and roller for moving said cam, and thereby tending to impart a slight further rotation to the shaft.

2. In a corn planter, the combination of a shaft adapted to operate dropper mechanism with means thereon adapted to be engaged by knots or the like on a wire, additional means operatively connected with said shaft and designed, when a knot on the wire has imparted a certain degree of rotation to the shaft, to yieldingly tend to impart slight further rotation to the shaft.

3. In a device of the class described, a frame, a grain box thereon, a shaft extending through said box, a dropper fixed thereon, a wire engaging wheel fixed to each end of said shaft, capable of an intermittent rotary movement in one direction, as the frame is advanced, a cam wheel on said shaft having a plurality of notches and projections, a pivoted arm, a roller on said arm in engagement with said cam wheel, and yielding means for pressing said roller against said cam wheel and a seed controlling device on said arm.

4. In a device of the class described, a frame, a grain box thereon, a horizontal shaft extending through said box, a disk fixed to said shaft, a dropper detachably connected to said disk, a cam wheel on said disk having a plurality of notches, yielding means for engaging the notches on said cam, and a seed controlling device operatively connected with said yielding means, and wire engaging means for rotating the shaft intermittently and in one direction.

5. In a device of the class described, the combination of a corn planter frame having a planter box, a dropper, a shaft, means for operating said dropper from said shaft, a grooved wheel on said shaft, provided with notches, a wire having knots, guide devices for holding said wire against said wheel, a cam device on said shaft having alternate points and depressions, an arm, a roller thereon, and yielding means for holding said roller against said cam.

Kimballton, Iowa, July 5th, 1913.

MADS H. MADSEN.

Witnesses:
T. G. MÜLLER,
P. A. MOLLER.